(12) United States Patent
Cen et al.

(10) Patent No.: US 11,368,611 B2
(45) Date of Patent: Jun. 21, 2022

(54) CONTROL METHOD FOR CAMERA DEVICE, CAMERA DEVICE, CAMERA SYSTEM, AND STORAGE MEDIUM

(71) Applicant: SZ DJI TECHNOLOGY CO., LTD., Shenzhen (CN)

(72) Inventors: Xianlong Cen, Shenzhen (CN); Gaoping Bai, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/137,964

(22) Filed: Dec. 30, 2020

(65) Prior Publication Data
US 2021/0120167 A1 Apr. 22, 2021

Related U.S. Application Data

(63) Continuation of application No. PCT/CN2018/094092, filed on Jul. 2, 2018.

(51) Int. Cl.
| | | |
|---|---|---|
| H04N 5/77 | (2006.01) |
| H04N 5/92 | (2006.01) |
| H04N 5/232 | (2006.01) |
| H04W 4/80 | (2018.01) |
| G10L 15/22 | (2006.01) |
| H04N 5/93 | (2006.01) |

(52) U.S. Cl.
CPC ......... *H04N 5/23206* (2013.01); *G10L 15/22* (2013.01); *H04N 5/232933* (2018.08); *H04N 5/77* (2013.01); *H04N 5/9202* (2013.01); *H04W 4/80* (2018.02)

(58) Field of Classification Search
CPC .... G10L 15/22; H04N 5/232; H04N 5/23203; H04N 5/23206; H04N 5/232933; H04N 5/76; H04N 5/77; H04N 5/9202; H04W 4/80

USPC ....... 386/224, 223, 227, 230, 239, 241, 248, 386/285, 337
See application file for complete search history.

(56) References Cited

U.S. PATENT DOCUMENTS

| | | | | |
|---|---|---|---|---|
| 2008/0117167 | A1* | 5/2008 | Aonuma | G06F 3/0346 345/157 |
| 2016/0334082 | A1* | 11/2016 | Chen | H04N 5/232 |
| 2017/0162230 | A1* | 6/2017 | Maliuk | G11B 31/006 |

FOREIGN PATENT DOCUMENTS

| | | |
|---|---|---|
| CN | 1728777 A | 2/2006 |
| CN | 102377923 A | 3/2012 |
| CN | 105472273 A | 4/2016 |
| CN | 105611191 A | 5/2016 |
| CN | 205754609 U | 11/2016 |
| CN | 205812389 U | 12/2016 |
| CN | 207251854 U | 4/2018 |

(Continued)

OTHER PUBLICATIONS

The World Intellectual Property Organizatin (WIPO) International Search Report for PCT/CN2018/094092 dated Apr. 2, 2019 5 pages.

*Primary Examiner* — Robert Chevalier
(74) *Attorney, Agent, or Firm* — Anova Law Group, PLLC

(57) ABSTRACT

A control method of a camera device includes receiving audio data transmitted by an acoustic-electric device via Bluetooth communication and mixing the audio data with the video data to produce a video with audio. The audio data is recorded by the acoustic-electric device during a process of capturing video data by the camera device.

19 Claims, 15 Drawing Sheets

(56) References Cited

FOREIGN PATENT DOCUMENTS

CN 207340106 U 5/2018

\* cited by examiner

CONTROL METHOD FOR CAMERA DEVICE, CAMERA DEVICE, CAMERA SYSTEM, AND STORAGE MEDIUM

CROSS-REFERENCE TO RELATED APPLICATION

This application is a continuation of International Application No. PCT/CN2018/094092, filed Jul. 2, 2018, the entire content of which is incorporated herein by reference.

TECHNICAL FIELD

The present disclosure relates to the field of electronic technology and, more particularly, to a control method for a camera device, a camera device, a camera system, and a computer-readable storage medium.

BACKGROUND

When a user is photographing using a camera, if there is a certain distance between the user and the camera, a video with audio recorded by the camera has problems that the user's voice is too low or the user's voice cannot be recorded.

SUMMARY

One aspect of the present disclosure provides a control method of a camera device includes receiving audio data transmitted by an acoustic-electric device via Bluetooth communication and mixing the audio data with the video data to produce a video with audio. The audio data is recorded by the acoustic-electric device during a process of capturing video data by the camera device.

Another aspect of the present disclosure provides a camera device including a Bluetooth circuit and a processor. The Bluetooth circuit is configured to receive audio data transmitted by an acoustic-electric device via Bluetooth communication. The audio data is recorded by the acoustic-electric device during a process of capturing video data by the camera device. The processor is configured to mix the audio data and the video data to produce a video with audio.

Another aspect of the present disclosure provides a camera system including an acoustic-electric device and a camera device. The camera device includes a Bluetooth circuit and a processor. The Bluetooth circuit is configured to receive audio data transmitted by the acoustic-electric device via Bluetooth communication. The audio data is recorded by the acoustic-electric device during a process of capturing video data by the camera device. The processor is configured to mix the audio data and the video data to produce a video with audio.

BRIEF DESCRIPTION OF THE DRAWINGS

FIG. 11 illustrates an exemplary synthesized image formed by applying a high-speed flying effect consistent with various embodiments of the present disclosure.

DETAILED DESCRIPTION OF THE EMBODIMENTS

Figure 1:
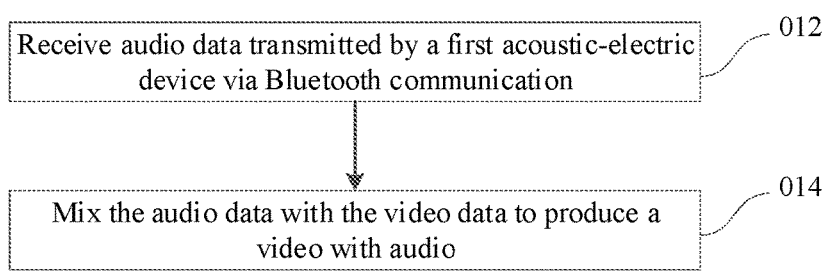
FIG. 1 illustrates an exemplary control method for a camera device consistent with various embodiments of the present disclosure.

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure. Example embodiments will be described with reference to the accompanying drawings, in which the same numbers refer to the same or similar elements unless otherwise specified.

The terms "first" and "second" are only used for descriptive purposes, and should not be understood as indicating or implying relative importance or implicitly indicating the number of indicated technical features. Therefore, a feature associated with "first" and "second" may explicitly or implicitly include one or more of such feature. In the description of the present disclosure, "plurality" means two or more than two, unless specifically defined otherwise.

As used herein, when a first component is referred to as "fixed to" a second component, it is intended that the first component may be directly attached to the second component or may be indirectly attached to the second component via another component. When a first component is referred to as "connecting" to a second component, it is intended that the first component may be directly connected to the second component or may be indirectly connected to the second component via a third component between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure. The term "and/or" used herein includes any suitable combination of one or more related items listed.

Different embodiments or examples are described below. To simplify the description of the embodiments, components and settings of specific examples are described below. They are only examples and are not intended to limit the disclosure. In addition, reference numerals and/or reference letters may be repeated in different examples for the purpose of simplification and clarity, and not to indicate the relationship between the various embodiments and/or settings described. In addition, the present disclosure provides examples of various specific processes and materials, but those of ordinary skill in the art may be aware of the use of other processes and/or materials.

Figure 2:
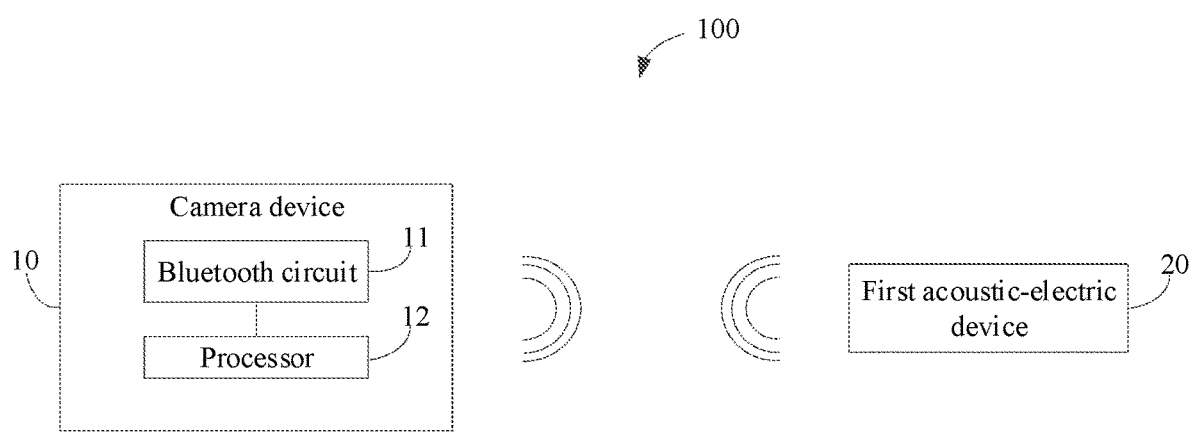
FIG. 2 illustrates an exemplary camera system consistent with various embodiments of the present disclosure.

FIG. 1 is a flow chart of a control method for a camera device 10 shown in FIG. 2 consistent with the disclosure. As shown in FIG. 1, the control method for the camera device 10 includes the following processes.

012: receiving audio data transmitted from a first acoustic-electric device 20 via Bluetooth communication, where the audio data is recorded by the first acoustic-electric device 20 when the camera device 10 is capturing video data.

014: mixing the audio data and the video data to produce a video with audio.

As illustrated in FIG. 2, the camera device 10 includes a Bluetooth circuit 11 and a processor 12. The Bluetooth circuit 11 may be configured to receive the audio data transmitted from the first acoustic-electric device 20 via Bluetooth communication. The audio data may be recorded by the first acoustic-electric device 20 when the camera device 10 is capturing the video data. The processor 12 may be configured to mixing the audio data and the video data to produce the video with audio. The Bluetooth circuit 11 and the processor 12 may be electrically connected to each other, such that the Bluetooth circuit 11 may be capable of transmitting the received audio data to the processor 12. Further, the video data captured by the camera device 10 may also be transmitted to the processor 12.

In the present disclosure, the control method may be implemented by the camera device 10 provided by the present disclosure. In the control method, the process 012 may be implemented by the Bluetooth circuit 11 and the process 014 may be implemented by the processor 12.

Most electronic devices (such as mobile phones) have both the ability to capture video data and the ability to record audio. Therefore, the electronic devices can be directly used to record video with audio. However, in some application scenes, a scene captured by the electronic device is relatively far away from the electronic device. For example, when a sports camera is used to photograph a user, there is a certain distance between the sports camera and the user because the sports camera may be mounted at another component, or the sports camera is far away from the user when the sports camera it is handheld. Correspondingly, the video with audio of the user recorded at this time is prone to problems that the sound is too low or cannot be recorded.

In some embodiments, the camera device 10 may be a sports camera. The sports camera may be a camera or another handheld camera device such as a handheld gimbal camera. In some other embodiments, the camera device 10 may also be mounted at another component such as a head-mounted equipment or a sports tool. The camera device 10 may be suitable for the user to capture video and synthesize audio and the video in sports scenes. For description purposes only, the present disclosure is described mainly using the camera device 10 applied in sports scenes as an example, which should not limit the scope of the present disclosure. For example, in some other embodiments, the camera device 10 may also be applied to other scenes suitable for recording and synthesizing video with audio separately. In some other embodiments, the camera device 10 may be another electronic device with photographing and Bluetooth functions, such as a mobile phone or a tablet.

In one embodiment, the control method of the camera device 10, and the camera device 10 may use the Bluetooth communication to enable communication between the first acoustic-electric device 20 and the camera device 10. Correspondingly, when the camera device 10 is at a certain distance from the user, especially when the user is doing exercise, the first acoustic-electric device 20 may be disposed around the user to capture the user's audio by using the first acoustic-electric device 20 in the case of photographing with separated human and device, or in the case of video with audio capture in different environments. Further, the audio data of the first acoustic-electric device 20 and the video data of the camera device 10 may be mixed to produce the video with audio having clear sound and moderate volume. Correspondingly, various photographing needs of users may be met and the user experience may be improved significantly. In one embodiment, the camera device 10 may be a sports camera. During the user's movement, when the camera device 10 is used to record the user, the camera device 10 may be at a certain distance from the user, but the first acoustic-electrical device 20 may be used to capture the user's audio data at the same time. The audio data and the video data captured by the camera device 10 may be synchronously mixed without requiring the user to keep the camera device 10 close to the mouth to record the audio data at all times. Correspondingly, the user's hands can move freely and can be more focused on photographing. It can be understood that the mixed video with audio may contain both images and sounds.

Further, although the camera device 10 may communicate with other devices through WIFI to realize the image transmission capability of the camera device 10, the power consumption of WIFI is much larger than that of Bluetooth, and hence using WIFI is easy to cause a large power consumption of the camera device 10. Especially on the miniaturized camera device 10, the disadvantage of high WIFI power consumption becomes more obvious. In the present disclosure, the camera device 10 may be applied to sports scenes, and therefore needs to be miniaturized, portable, and mobile. The use of Bluetooth communication to communicate with the first acoustic-electric device 20 may effectively reduce the power consumption of the camera device 10.

The first acoustic-electric device 20 may be any device including an acoustic-electric component. The acoustic-electric components may refer to components that can convert sound information into electrical information. The acoustic-electric components may include, for example, microphones, and sound pickups. The first acoustic-electric device 20 may be, for example, a mobile phone, a Bluetooth microphone, or a tablet. The first acoustic-electric device 20 may also include a Bluetooth circuit (not shown), and the Bluetooth circuit 11 of the camera device 10 and the Bluetooth circuit of the first acoustic electric device 20 may perform Bluetooth communication.

In some embodiments, the audio data received by the Bluetooth circuit 11 of the camera device 10 may be audio data in an audio transmission format. That is, the first acoustic-electric device 20 may encode the audio data and send it to the camera device 10, where the audio coding format may be but not limited to sub-band coding (SBC), advanced audio coding (AAC), or aptX.

In the present disclosure, the audio data may be synchronously recorded by the first acoustic-electric device 20 when the camera device 10 is capturing the video data. Correspondingly, mismatches between the audio data and the video data, for example, a state that the current scene described by the audio data is slower than the current scene described by the video data, may be avoided. Therefore, the obtained audio data and video data are highly correlated, such that the highly correlated audio data and video data can be mixed to produce a more satisfactory video with audio for the user. For example, during the user's exercise, the camera device 10 may capture the user's video data (such as facial expressions or body movement information), that the user is waving his hand or showing victory gestures, the first acoustic-electric device 20 may synchronously capture the audio data corresponding to the user at this time, such as users yelling "Won" or "Yeah." Correspondingly, the mixed video with audio may be more consistent with the actual scenes.

Figure 3:
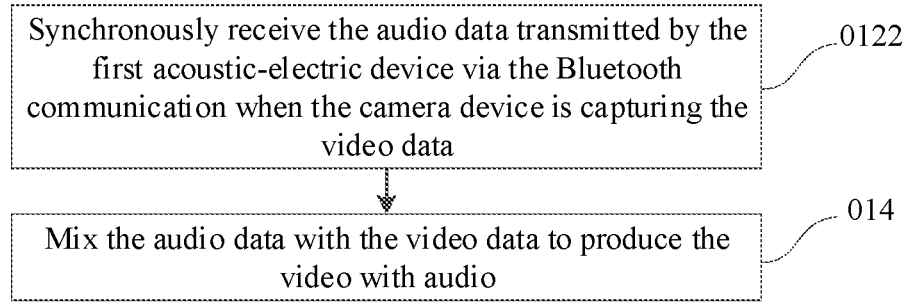
FIGS. 3-6 illustrate some other exemplary control methods for a camera device consistent with various embodiments of the present disclosure.

In some embodiment, as illustrated in FIG. 3, the process 012 includes the following process.

0122: synchronously receiving the audio data transmitted from the first acoustic-electric device 20 through the Bluetooth communication, when the camera device 10 is capturing the video data.

Referring again to FIG. 2, in some embodiments, the Bluetooth circuit 11 may be configured to synchronously receive the audio data transmitted from the first acoustic-electric device 20 through the Bluetooth communication when the camera device 10 is capturing the video data. That is, the process 0122 may be implemented by the Bluetooth circuit 11.

Specifically, to mix the audio data and the video data in real-time to produce the video with audio, when the camera device 10 is capturing the video data, the Bluetooth circuit 11 may synchronously receive the audio data of the first acoustic-electric device 20 in real-time, such that the camera device 10 may acquire the synchronized video and audio data at the same time. The processor 12 may mix the audio data and the video data in real-time to produce the video with audio. After the video with audio is formed in real-time, the video with audio may be played back in real-time or processed. Correspondingly, the real-time video with audio can be obtained.

In some other embodiments, the first acoustic-electric device 20 may save the audio data recorded synchronously when the camera device 10 captures the video data. The camera device 10 may receive the audio data corresponding to the video data after the camera device 10 captures the video data, and then mix the audio data and the video data. As such, problems such as freezing or downtime caused by receiving the audio data or mixing process when the camera device 10 captures the video data may be avoided.

Figure 4:
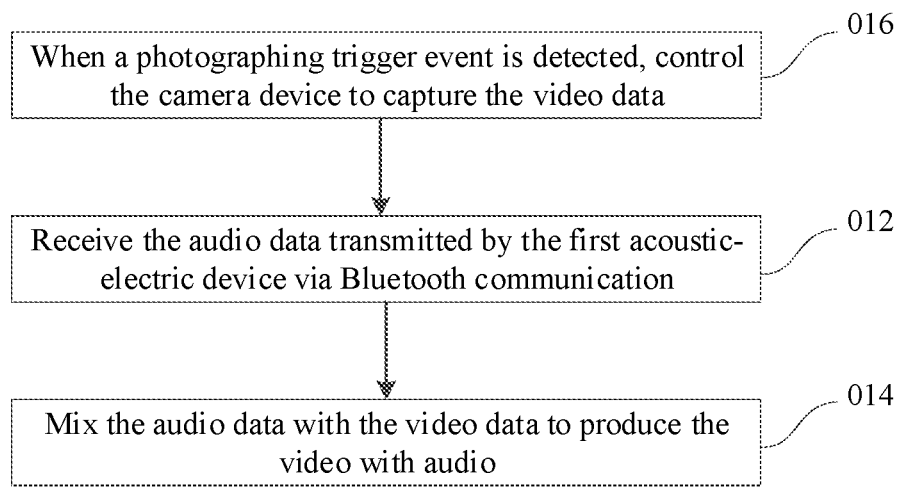

As illustrated in FIG. 4, in some embodiments, before the process 012, the control method further includes the following process.

016: when a photographing trigger event is detected, controlling the camera device 10 to capture the video data.

Referring again to FIG. 2, in some embodiments, before receiving the audio data transmitted by the first acoustic-electric device 20 through the Bluetooth communication, the processor 12 further controls the camera device 10 to capture the video data when detecting a photographing trigger event. That is, the process 016 may be implemented by the processor 12.

Thus, the user may control a photographing trigger event to occur according to needs, thereby controlling the camera device 10 to capture the video data. Further, when the camera device 10 captures the video data, the first acoustic-electric device 20 may be controlled to record the audio data. The photographing trigger event may be formed by the user to trigger a button (a physical button or a virtual button) for photographing on the camera device 10. In one embodiment, it is determined that a photographing trigger event is detected when the user triggers the photographing button on the camera device 10. Of course, the photographing trigger event may also occur in other ways, such as voice-triggered photographing, somatosensory input-triggered photographing, or touching (such as clicking, sliding, or pressing) on a display screen 14 of the camera device 10 to trigger the photographing. The present disclosure has no limit on this.

Further, when the photographing trigger event is detected, the first acoustic-electric device 20 may synchronously record the audio data when the camera device 10 is capturing the video data and transmit the audio data to the camera device 10 in real-time. Thus, the camera device 10 may obtain corresponding video data and the audio data in real-time through the photographing trigger event, to mix and form the video with audio. In some other embodiments, the audio data may be transmitted to the camera device 10 after the video data is captured.

In some embodiments, when the photographing trigger event is detected and the camera device 10 starts to capture the video data, the synchronous capture of the audio data by the first acoustic-electric device 20 may be triggered by the camera device 10. In some other embodiments, the synchronous capture of the audio data by the first acoustic-electric device 20 may be triggered by other conditions or other devices, such that the synchronous capture of the audio data with the video data may be implemented in the beginning. In some other embodiments, the audio data may be recorded during the video data capturing process, to achieve synchronization with the corresponding video data. That is, the current audio data may be synchronously correlated and match with the current video data.

Figure 5:
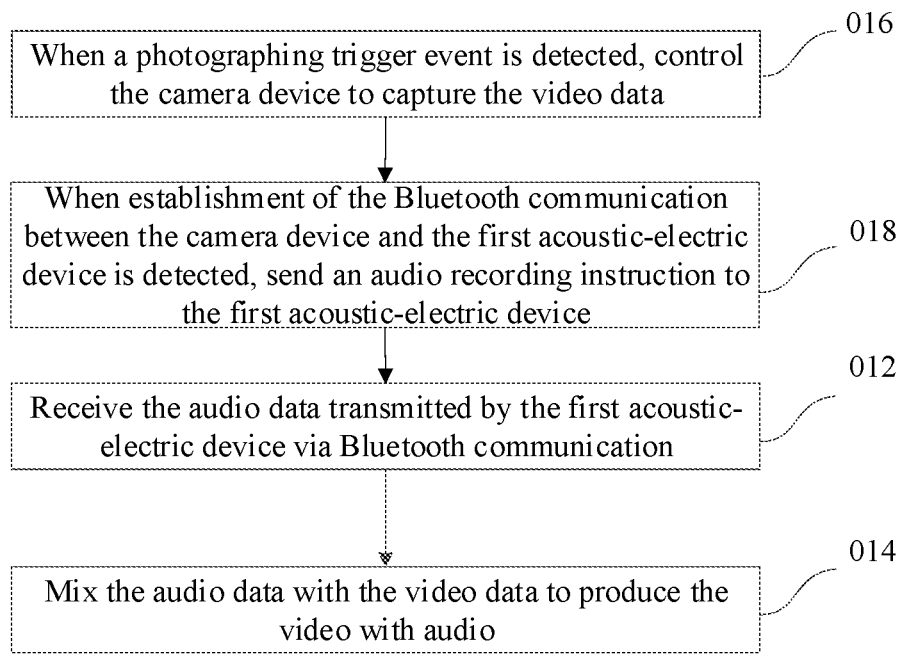

In some embodiments, as illustrated in FIG. 5, the control method further includes the following process.

018: when the establishment of the Bluetooth communication between the camera device 10 and the first acoustic-electric device 20 is detected, sending an audio recording instruction to the first acoustic-electric device 20, such that the first acoustic-electric device 20 records the audio data according to the audio recording instruction.

As illustrated in FIG. 2, in some embodiments, the Bluetooth circuit 11 is further configured to: when the establishment of the Bluetooth communication between the camera device 10 and the first acoustic-electric device 20 is detected, send the audio recording instruction to the first acoustic-electric device 20, such that the first acoustic-electric device 20 records the audio data according to the audio recording instruction. That is, the process 018 is implemented by the Bluetooth circuit 11.

Specifically, when the camera device 10 captures the video data, whether the Bluetooth communication between the camera device 10 and the first acoustic-electric device 20 is established or not may be detected. When the establishment of the Bluetooth communication between the camera device 10 and the first acoustic-electric device 20 is detected, the camera device 10 may send the audio recording instruction to the first acoustic-electric device 20 through the Bluetooth circuit 11, such that the first acoustic-electric device 20 may start working to record the audio data after the first acoustic-electric device receives the audio recording instruction.

In some embodiments, when establishment of the Bluetooth communication between the camera device 10 and the first acoustic-electric device 20 is not detected, the camera device 10 may try to establish the Bluetooth communication with the first acoustic-electric device 20, prompt the user, or record the audio data using other methods. In one embodiment, if it is detected that the camera device 10 and the first acoustic-electric device 20 have not established the Bluetooth communication, the Bluetooth circuit 11 of the camera device 10 may be automatically turned on and try to connect with the Bluetooth circuit of the first acoustic-electric device 20, such that the Bluetooth communication can be quickly established. In another embodiment, if it is detected that the camera device 10 and the first acoustic-electric device 20 have not established Bluetooth communication, the user may be prompted with the message "Bluetooth communication is not established." The method of prompting the user may use voice, image, text, or photoelectric display. For example, the text "Bluetooth communication not established" may be displayed on the camera device 10 to prompt the user. Therefore, the user may know the Bluetooth connection status between the camera device 10 and the first acoustic-electric device 20. In another embodiment, the camera device 10 may include an acoustic-electric component. When it is detected that the camera device 10 and the first acoustic-electric device 20 have not established the Bluetooth communication, the acoustic-electric component of the camera device 10 may be turned on, and the camera device 10 may use the acoustic-electric component to record audio data. In this process, if the camera device 10 establishes the Bluetooth communication with the first acoustic-electric device 20, it may be converted to use the first acoustic-electric device 20 to record the audio data. Therefore, the video data corresponding to the audio data may be partly captured by the acoustic-electric component of the camera device 10 and partly captured by the first acoustic-electric device 20. As such, when the first acoustic-electric device 20 does not record the audio data, the camera device 10 can still form the video with audio, and may have multiple audio and video synthesis methods.

In some other embodiments, when it is detected that the camera device 10 and the first acoustic-electric device 20 have not established the Bluetooth communication, the camera device 10 may be controlled to not or stop capture the video data. The present disclosure has no limit on this.

Figure 6:
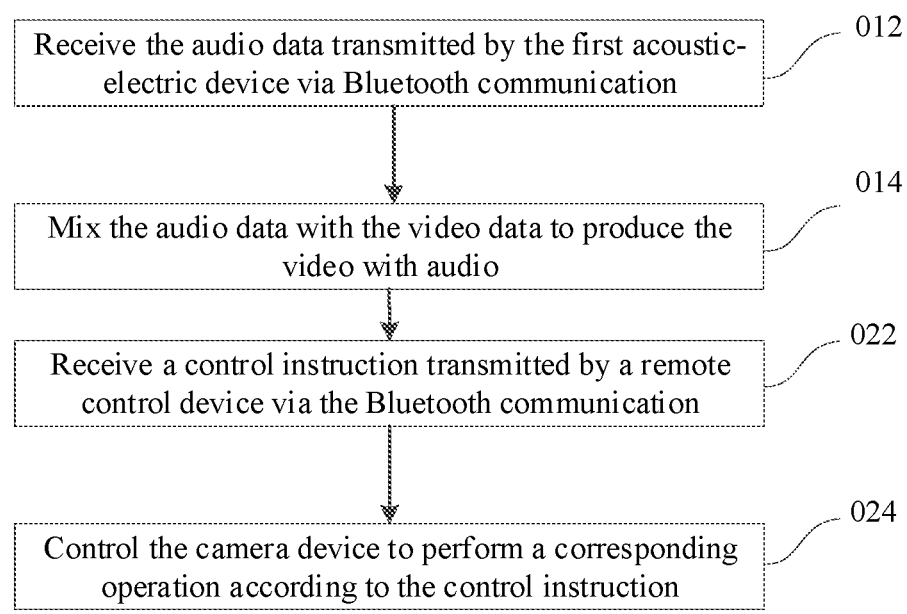
Figure 7:
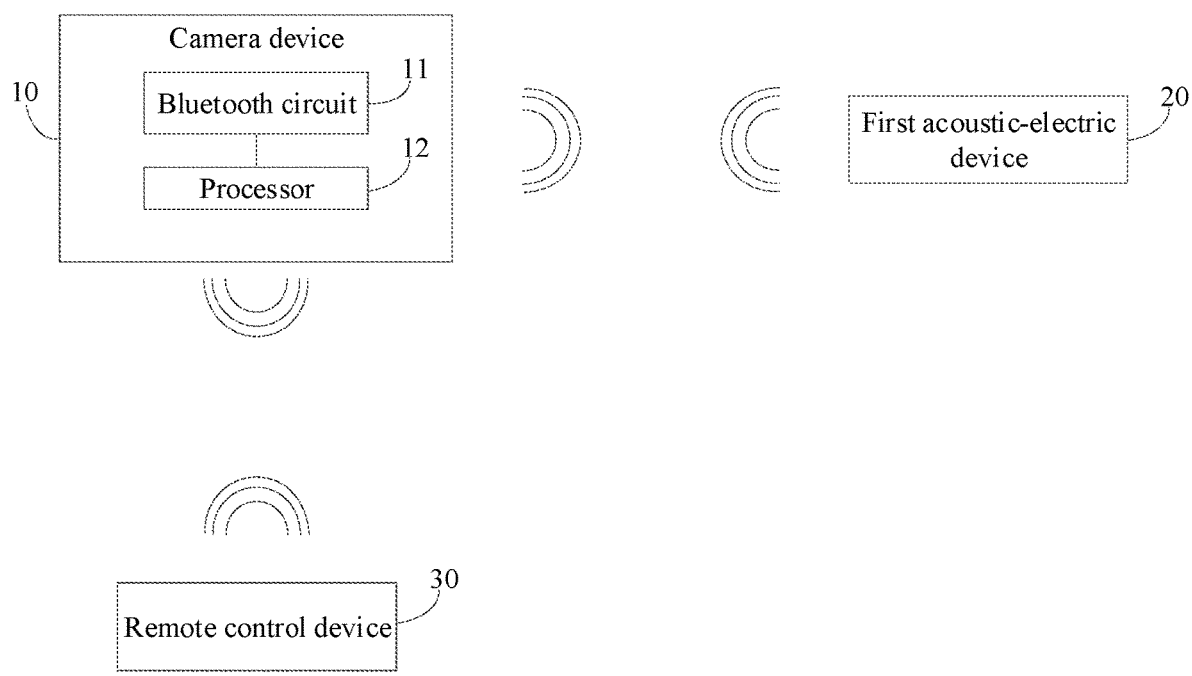
FIG. 7 illustrates communication between a first acoustic-electric device, a remote control device, and a camera device consistent with various embodiments of the present disclosure.

In some embodiments, as shown in FIG. 7, the camera device 10 also communicates with a remote control device 30. As shown in FIG. 6, the control method further includes the following processes.

022: receiving a control instruction transmitted by the remote control device 30 through the Bluetooth communication.

024: controlling the camera device 10 to perform a corresponding operation according to the control instruction.

As illustrated in FIG. 7, in some embodiments, the Bluetooth circuit 11 is further configured to receive the control instruction transmitted by the remote control device 30 through the Bluetooth communication. The processor 12 is further configured to control the camera device 10 to perform the corresponding operation according to the control instruction. That is, the process 022 is implemented by the Bluetooth circuit 11 and the process 024 is implemented by the processor 12.

Specifically, the remote control device 30 may be, for example, a mobile phone, a tablet, a Bluetooth remote control, etc., and the remote control device 30 may communicate with the camera device 10 through Bluetooth communication. The remote control device 30 may form a control instruction according to the user's input, and send the control instruction to the camera device 10. After receiving the control instruction sent by the remote control device 30, the Bluetooth circuit 11 may transmit the control instruction to the processor 12, such that the processor 12 may control the camera device 10 to perform corresponding operations according to the control instruction. In this way, the user can control the camera device 10 according to the remote control device 30.

In some embodiments, the user's input may be a button input, and the control instruction may be a button control instruction. The remote control device 30 may include a button (not shown in the figure). The control instruction generated by the button is called a button control instruction. The button control instruction may be relatively small and may be packaged as data based on the BLE standard and the GATT Profile before being sent. The button may be a physical button. For example, the camera device 10 may complete corresponding operations according to a button value of the physical button. The button may also be a virtual button. For example, the remote control device 30 may include a touch-control display screen that can display an icon for generating the control instruction as the virtual button, and the camera device 10 may complete corresponding operations according to the function indicated by the icon. In some other embodiments, of course, the user's input may also be voice input or somatosensory input. Correspondingly, the control instruction may be a voice control instruction or a somatosensory control instruction. A transmission form of the control instruction may also change based on the type of the control instruction. For example, when the user's input is the voice input, the user's input may be encoded into the corresponding audio format and then transmitted, there is no specific limitation here.

The remote control device 30 may be a control device with only button function and Bluetooth function, such as a Bluetooth remote control, for controlling the camera device 10. When the control instruction transmitted by the remote control device 30 is not a button control instruction, the remote control device 30 may be a functional control device with other functions including voice collection functions and display functions. The present disclosure has no limit on this.

In the embodiment shown in FIG. 6, the process 022 and the process 024 are performed after the process 012 and the process 014. In another embodiment, according to different control instructions, the process 022 and the process 024 may be performed before the process 012 and the process 014. In another embodiment, the process 022 and the process 024 may be performed at a same time of the process 012 and the process 014. In some other embodiments, the process 012, the process 014, the process 022, and the process 024 may be performed in any suitable order. The present disclosure has no limit on this.

Different control instructions may control the camera device 10 to perform different operations. For example, the control instruction may be a focus instruction, which can control the camera 10 to focus. The control instruction may be a sensitivity adjustment instruction, which can control the camera device 10 to adjust the sensitivity. In some embodiments, the control instruction may be a video recording instruction, and the reception of the control instruction may be the occurrence of the photographing trigger event, that is, the video recording instruction can control the camera device 10 to capture the video data.

In some embodiments, the first acoustic-electric device 20 and the remote control device 30 may be integrated into a device, or may communicate with each other. Therefore, when the camera device 10 captures the video data after receiving the video recording instruction transmitted by the remote control device 30 through the Bluetooth communication, the first acoustic-electric device 20 may also synchronously record the audio data according to the video recording instruction. As such, the video recording instruction of the remote control device 30 may be used to control the camera device 10 and the first acoustic-electric device 20 to work at the same time to synchronously capture the video data and the audio data. A good video with audio may be achieved.

Figure 8:
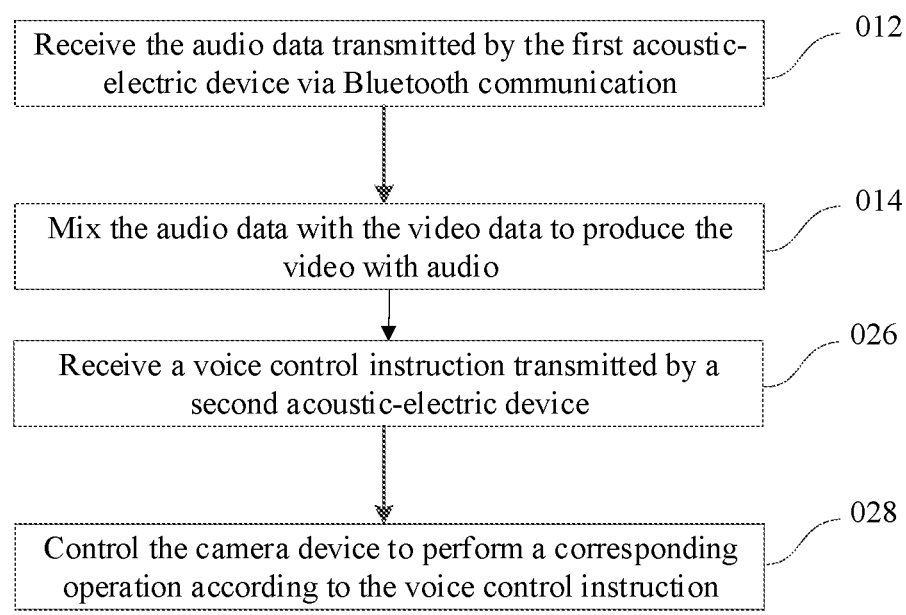
FIG. 8 illustrates another exemplary control method for a camera device consistent with various embodiments of the present disclosure.
Figure 9:
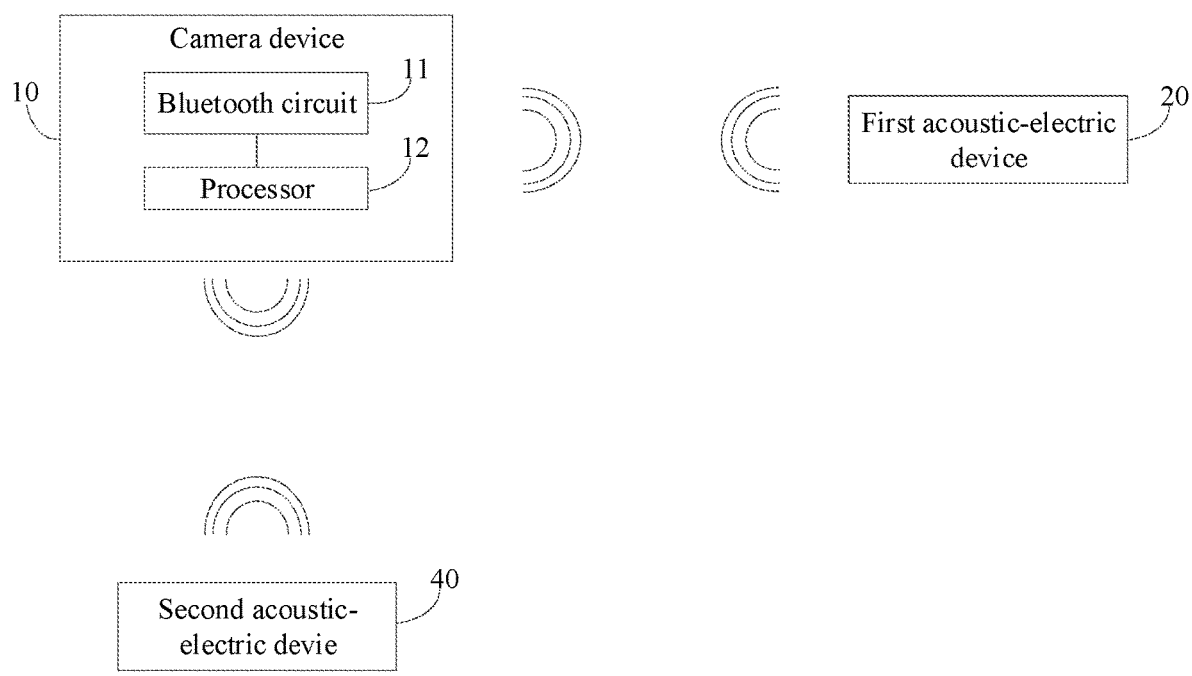
FIG. 9 illustrates communication between a second acoustic-electric device, a remote control device, and a camera device consistent with various embodiments of the present disclosure.

In some embodiments, as shown in FIG. 9, the camera device 10 also communicates with a second acoustic-electric device 40. As shown in FIG. 8, the control method further includes the following processes.

026: receiving a voice control instruction transmitted by the second acoustic-electric device 40 through the Bluetooth communication.

028: controlling the camera device 10 to perform a corresponding operation according to the voice control instruction.

As illustrated in FIG. 9, in some embodiments, the Bluetooth circuit 11 is further configured to receive the voice control instruction transmitted by the second acoustic-electric device 40 through the Bluetooth communication. The processor 12 is further configured to control the camera device 10 to perform the corresponding operation according to the voice control instruction. That is, the process 026 is implemented by the Bluetooth circuit 11 and the process 028 is implemented by the processor 12.

Specifically, the second acoustic-electric device 40 may also be any device that includes acoustic-electric components. The acoustic-electric components may refer to elements that can convert sound information into electrical information. For example, the acoustic-electric components may include microphones or voice pickups. For example, the second acoustic-electric device 40 may be a mobile phone, a Bluetooth microphone, or a tablet. The second acoustic-electric device 40 and the camera device 10 may also communicate via the Bluetooth communication. The second acoustic-electric device 40 may form a voice control instruction according to the user's voice input, and send the voice control instruction to the camera device 10. The voice control instruction may be encoded into an audio transmission format before transmission. For example, the audio transmission format may be SBC, AAC, or aptX. After the Bluetooth circuit 11 receives the voice control instruction sent by the second acoustic-electric device 40, the Bluetooth circuit 11 may transmit the voice control instruction to the processor 12, and the processor 12 may decode the voice control instruction into an audio file format. The audio file format may include, for example, PCM, WAV or AMR. Then, the voice recognition method may be used to recognize the operation instruction corresponding to the voice control instruction, such that the processor 12 may control the camera device 10 to perform the corresponding operations. Correspondingly, the user may control the camera device 10 according to the second acoustic-electric device 40.

In the embodiment shown in FIG. 8, the process 026 and the process 028 are performed after the process 012 and the process 014. In another embodiment, according to different control instructions, the process 026 and the process 028 may be performed before the process 012 and the process 014. In another embodiment, the process 026 and the process 028 may be performed at a same time of the process 012 and the process 014. In some other embodiments, the process 012, the process 014, the process 026, and the process 028 may be performed in any suitable order. The present disclosure has no limit on this.

Different voice control instructions may control the camera device 10 to perform different operations. For example, the voice control instruction may be a focus instruction, and the focus instruction may control the camera device to focus. The voice control instruction may be a sensitivity adjustment instruction, which can control the camera device 10 to adjust the sensitivity. In some embodiments, the voice control instruction may be a video recording instruction, and the reception of the control instruction may be the occurrence of the photographing trigger event, that is, the video recording instruction can control the camera device 10 to capture the video data.

In some embodiments, the second acoustic-electric device 40 and the first acoustic-electric device 20 may be a same device. For example, the first acoustic-electric device 20 may be configured to control the camera device 10 through the voice control instruction and to record the audio data. In one embodiment, when the Bluetooth communication between the first acoustic-electric device 20 and the camera device 10 is established, the voice control instruction may be inputted through the first acoustic-electric device 20. The voice control instruction may be the video recording instruction to control the camera device 10 to start capturing the video data. While the first acoustic-electric device 20 controls the camera device 10 to capture the video data according to the video recording instruction, the first acoustic-electric device 20 may also start to synchronously capture the audio data according to the video recording instruction. Therefore, the camera device 10 and the first acoustic-electric device 20 may be controlled to start working simultaneously by using the video recording instruction, to capture the video data and the audio data synchronously. Problems that the audio data is lagging behind the video data or the video data is lagging behind the audio data may be avoided, and the video with audio may have good quality.

In some other embodiments, the second acoustic-electric device 40 and the first acoustic-electric device 20 may be different devices. The present disclosure has no limit on this.

Figure 10:
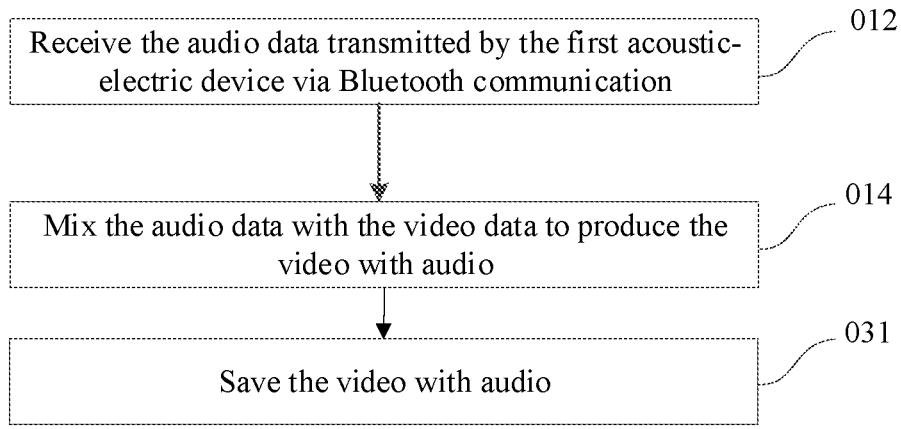
FIGS. 10-11 illustrate some other exemplary control methods for a camera device consistent with various embodiments of the present disclosure.

In some embodiments, as illustrated in FIG. 10, after the process 014, the control method further includes the following process.

031: saving the video with audio.

Referring again to FIG. 2, in some embodiments, after mixing the audio data and the video data to produce the video with audio, the processor 12 further saves the video with audio. That is, the process 031 is implemented by the processor 12.

Specifically, in some embodiments, the camera device 10 may include a storage device (not shown in the figures), and the processor 12 may save the video with audio in the storage device. In some other embodiments, the processor 12 may transmit the video with audio to other storage devices through the Bluetooth circuit 11 or other communication modules, to store the video with audio in other storage devices. For example, other storage devices may include SD cards, servers, or user terminals.

Figure 11:
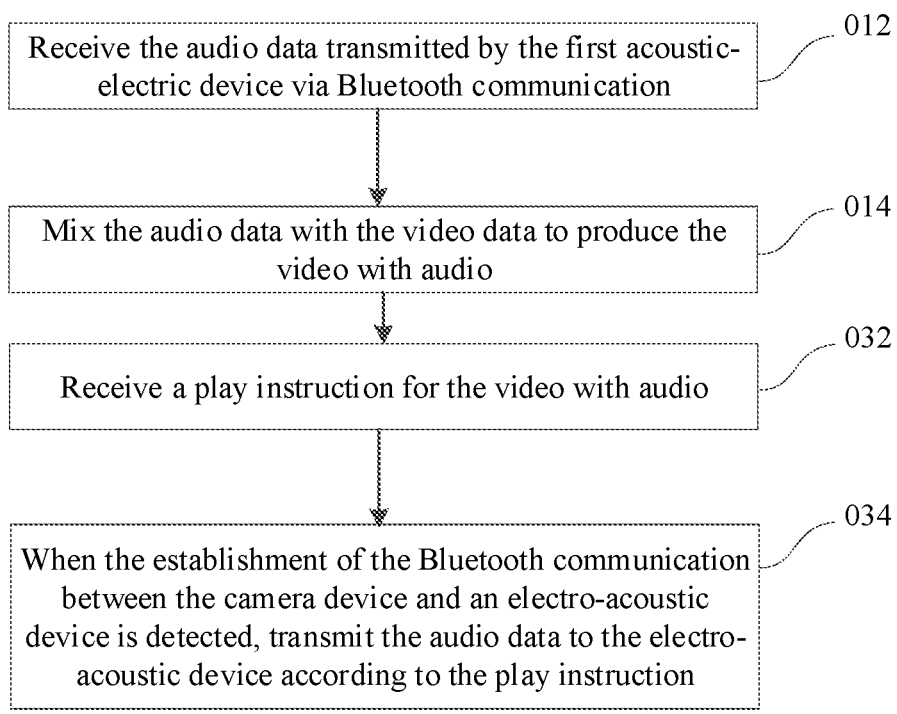
Figure 12:
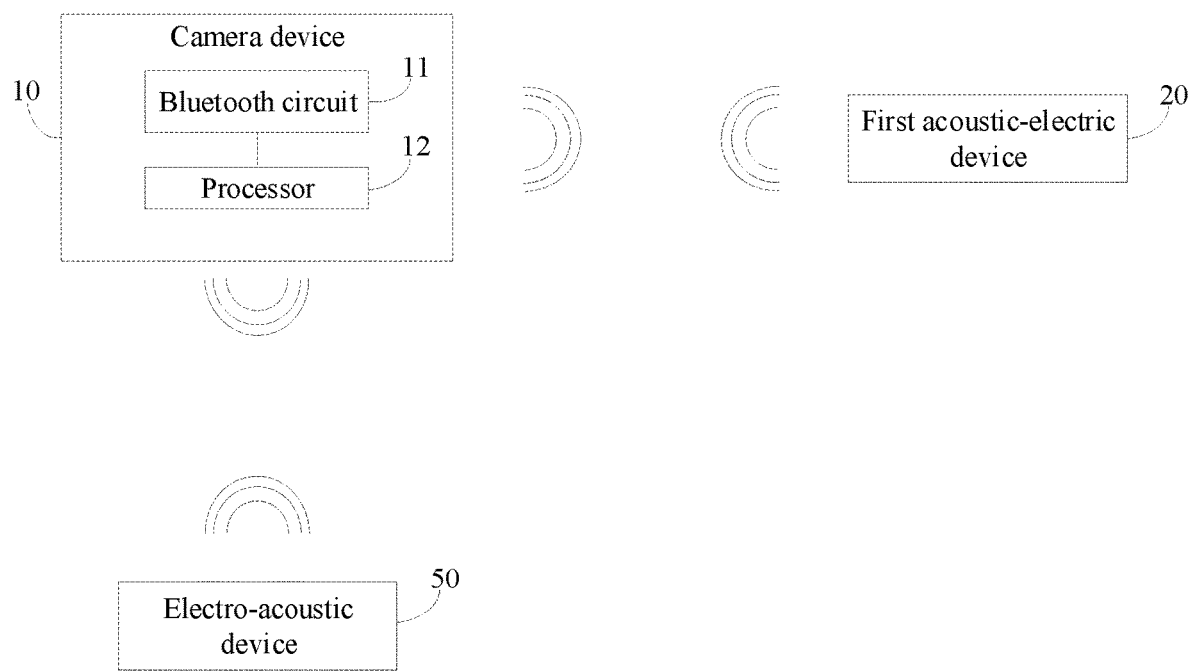
FIG. 12 illustrates communication between an acoustic-electric device, a remote control device, and a camera device consistent with various embodiments of the present disclosure.

In some embodiments, as shown in FIG. 12, the camera device also communicates with an electro-acoustic device 50. As shown in FIG. 11, after the process 014, the control method further includes the following processes.

032: receiving a play instruction for the video with audio.

034: when the establishment of the Bluetooth communication between the camera device 10 and the electro-acoustic device 50 is detected, transmitting the audio data in the video with audio to the electro-acoustic device 50 according to the play instruction, such that the electro-acoustic device 50 plays the audio data.

Referring to FIG. 12, in some embodiments, after mixing the audio data and the video data to produce the video with audio, the processor 12 further receives the play instruction for the video with audio. The Bluetooth circuit 11 is further configured to, when the establishment of the Bluetooth communication between the camera device 10 and an electro-acoustic device 50 is detected, transmit the audio data in the video with audio to the electro-acoustic device 50 according to the play instruction, such that the electro-acoustic device 50 plays the audio data. That is, the process 032 is implemented by the processor 12, and the process 034 is implemented by the Bluetooth circuit 11.

The electro-acoustic device 50 may be any device that includes an electro-acoustic component. The electro-acoustic component may refer to a component that can convert electrical information into sound information. For example, the electro-acoustic component may include a horn, an earphone, or a speaker. The electro-acoustic device 50 may be, for example, a mobile phone, a Bluetooth headset, or a tablet. The electro-acoustic device 50 and the camera device 10 may communicate with each other through Bluetooth communication. In one embodiment, the user may enter a playback interface of the camera device 10 and select a video to be played, such that the processor 12 may receive the play instruction. After receiving the play instruction, the processor 12 may parse the video with audio to separate the video data from the audio data. At the same time, the processor 12 may determine whether the camera 10 and the electro-acoustic device 50 have established Bluetooth communication. If the camera 10 and the electro-acoustic device 50 have established Bluetooth communication, the processor 12 may transmit the audio data to the electro-acoustic device 50 through the Bluetooth circuit 11, such that the electro-acoustic device 50 may play the audio data. Also, the video data may be played on the camera device 10, or the camera device 10 may transmit the video data to other playback devices for playing. In other embodiments, the user may also trigger the play instruction in other ways. For example, the play instruction may be transmitted to the camera device 10 through at least one of the first acoustic-electric device 20, the remote control device 30, or the second acoustic-electric device 40 of the above-described embodiments.

In some embodiments, when it is detected that the camera device 10 and the electro-acoustic device 50 have not established Bluetooth communication, the camera device 10 may try to establish Bluetooth communication with the electro-acoustic device 50, or prompt the user, or use other methods to play audio data. In one embodiment, when it is detected that the camera device 10 and the electro-acoustic device 50 have not established Bluetooth communication, the Bluetooth circuit 11 of the camera device 10 may be automatically turned on and try to connect with a Bluetooth circuit of the electro-acoustic device 50, such that the Bluetooth communication may be quickly established. In another embodiment, if it is detected that the camera 10 and the electro-acoustic device 50 have not established Bluetooth communication, the user may be prompted with the message "Bluetooth communication is not established." The user may be prompted by voice, image, text, or photoelectric display. For example, by displaying the text "Bluetooth communication not established" on the camera device 10, the user may know the Bluetooth connection status of the camera device 10 and the electro-acoustic device 50. In another embodiment, the camera device 10 may include an electro-acoustic component. When it is detected that the photographing device 10 and the electro-acoustic device 50 have not established Bluetooth communication, the electro-acoustic component of the camera device 10 may be turned on, and the electro-acoustic component of the camera device 10 may be used to play the audio data. When the camera device 10 and the electro-acoustic device 50 establish Bluetooth communication, the electro-acoustic device 50 may be used to continue to play a remaining portion of audio data. Therefore, the video with audio may be played normally, and there may be multiple playing modes.

In some other embodiments, if it is detected that the camera 10 and the electro-acoustic device 50 have not established Bluetooth communication, the video with audio may be not played or the play of the video with audio may be stopped. The present disclosure has no limit on this.

Figure 13:
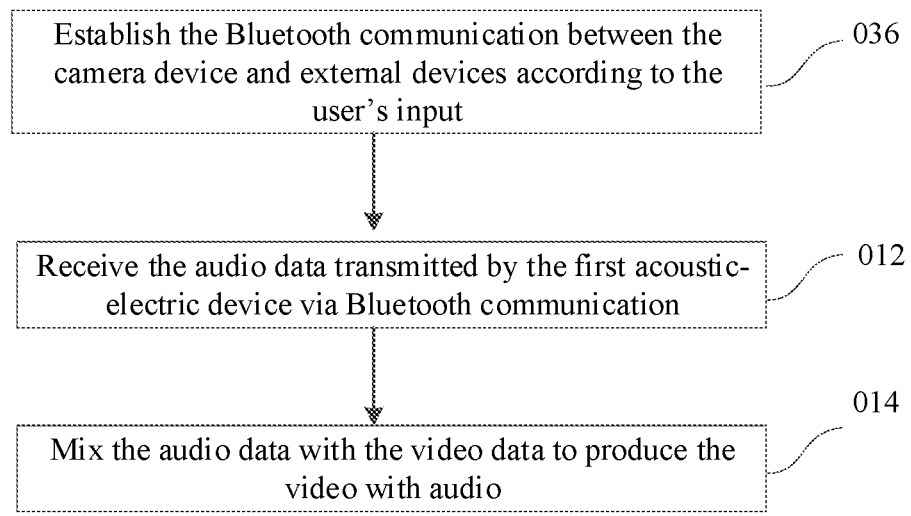
FIG. 13 illustrates another exemplary control method for a camera device consistent with various embodiments of the present disclosure.

In some embodiments, as illustrated in FIG. 13, the control method further includes the following process.

036: establishing the Bluetooth communication between the camera device 10 and external devices according to the user's input, where the external devices may include the first acoustic-electric device 20.

Referring again to FIG. 2, in some embodiments, the processor 12 is further configured to establish the Bluetooth communication between the camera device 10 and the external devices according to the user's input, where the external devices may include the first acoustic-electric device 20. That is, the process 036 is implemented by the processor 12.

Before Bluetooth communication is performed between the camera device 10 and the external devices, it may be determined whether the user's input is received, such that the Bluetooth communication between the camera device 10 and the external devices may be established according to the user's input, where the external devices may include at least one of the first acoustic-electric device 20, the remote control device 30, the second acoustic-electric device 40, or the electro-acoustic device 50. When multiple external devices exist at the same time, such as the first acoustic-electric device 20, the remote control device 30, the second acoustic-electric device 40, and the electro-acoustic device 50 exist at the same time, the camera device 10 may be selected to perform the Bluetooth communication with one or more of the multiple external devices according to the user's input. Further, in some embodiments, the multiple external devices may be integrated into one device (such as a mobile phone, or a tablet). For example, the first acoustic-electric device 20, the remote control device 30, the second acoustic-electric device 40, and the electro-acoustic device 50 may be integrated into a mobile phone that has Bluetooth communication capability, acoustic-electric conversion capability, buttons (physical buttons or virtual buttons), and electro-acoustic conversion capabilities at the same time.

The user's input may be an input for the camera device 10, or an input for an external device through the user when the external device is connected communicatively with the camera device 10. The user's input may have different types and may include but not be limited to button input, touch-control input, voice input, or somatosensory input.

In some embodiments, the external device may communicate with the camera device 10 through Bluetooth A2DP prototype.

Figure 14:
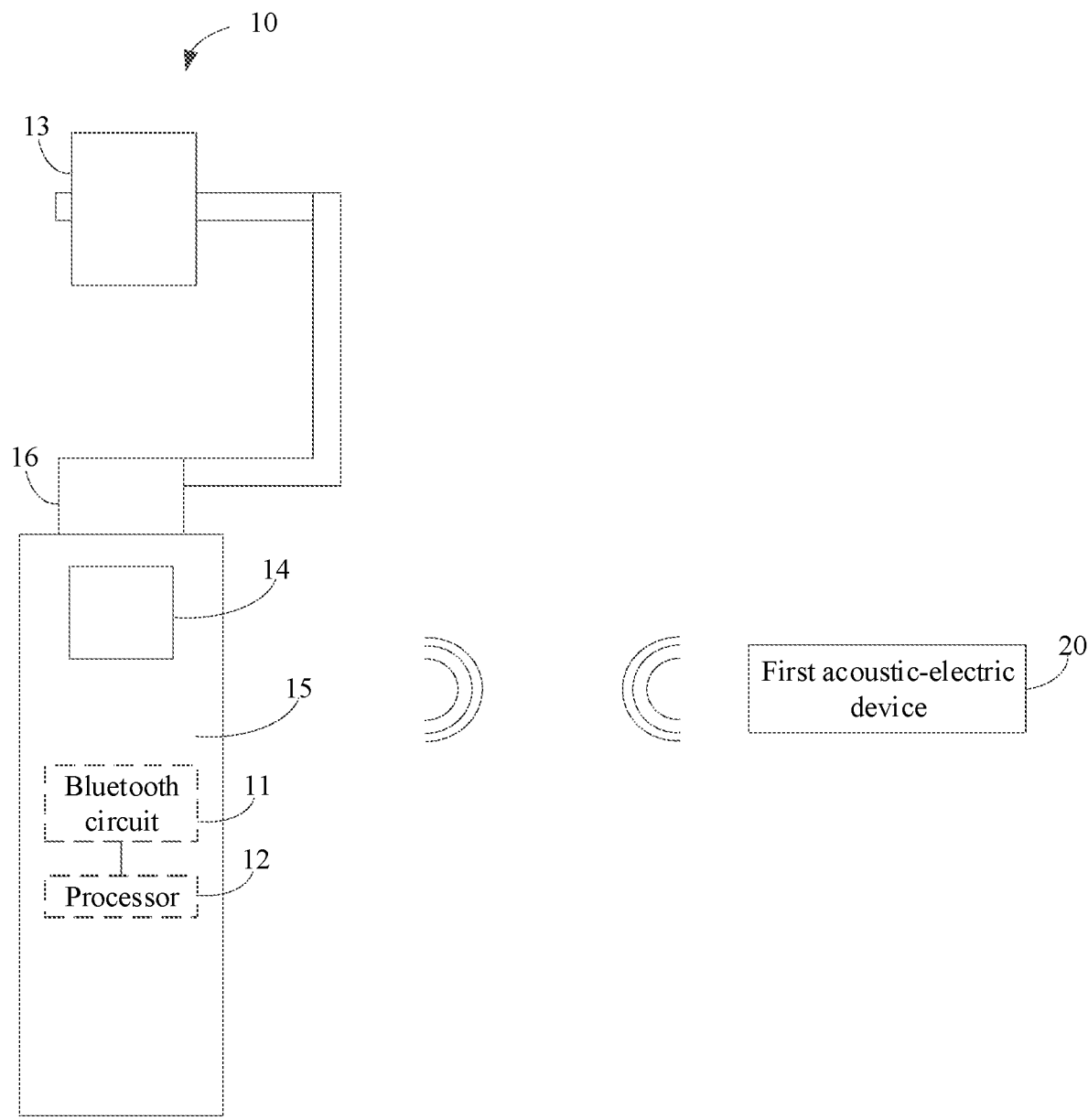
FIG. 14 illustrates an exemplary camera device consistent with various embodiments of the present disclosure.

In some embodiments, as illustrated in FIG. 14, the camera device 10 further includes a photographing member 13, a display panel 14, and a handheld member 15. The handheld member 15 may be used to support the photographing member 13, and the display screen 14 may be disposed on the handheld member 15. The photographing member 13 may be used to photograph images and/or videos. The photographing member 13 may include, for example, a lens and an image sensor. The display screen 14 may be used to display images and/or videos captured by the photographing member 13. The handheld member 15 can enable the user to better hold the camera device 10.

In some embodiments, the camera device 10 may further include a stabilization device 16. For example, in one embodiment, the stabilization device 16 may be a gimbal. The gimbal may be able to rotate while the camera device 10 is working to eliminate shaking of the photographing device 10, such that the quality of the captured image and/or video by the camera device 10 is better.

In various embodiments, the gimbal may be a single-axis gimbal, a dual-axis gimbal, or a three-axis gimbal. The gimbal may stabilize the camera device 10 in corresponding directions or may be used to adjust a photographing angle of the camera device 10.

Figure 15:
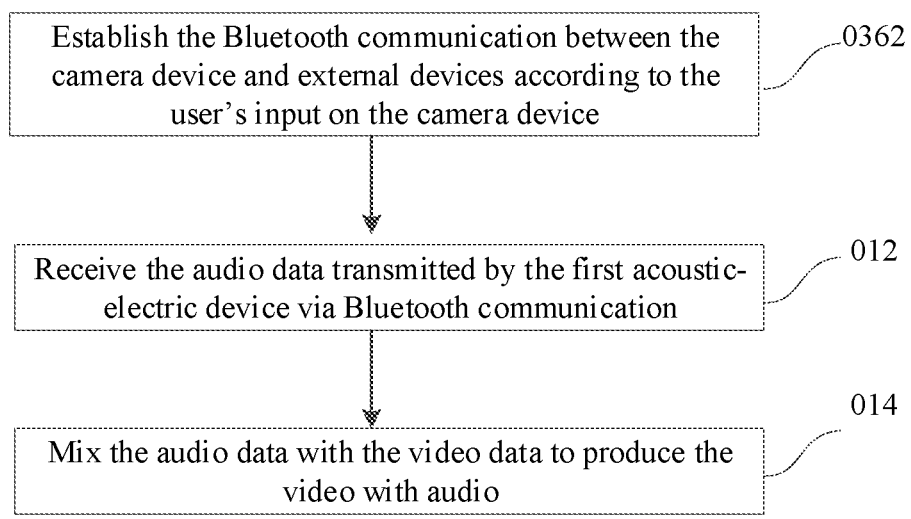
FIGS. 15-16 illustrate some other exemplary control methods for a camera device consistent with various embodiments of the present disclosure.

In some embodiments, as shown in FIG. 15, the process 036 includes the following process.

0362: establishing the Bluetooth communication between the camera device 10 and the external device according to the user's input on the camera device.

In some embodiments, as illustrated in FIG. 14, the processor 12 further establishes the Bluetooth communication between the camera device 10 and the external device according to the user's input on the camera devices. That is, the process 0362 is implemented by the processor 12.

Specifically, when the user is able to operate the camera device 10 directly (for example, when the user handholds the camera device 10), the user may perform input directly on the camera device 10 to establish the Bluetooth communication between the camera device 10 and the external device according to the user's input on the camera devices. The user's input on the camera device 10 may be that the user inputs the button information using the button of the camera device 10, the user inputs voice information using the voice recognition capability of the camera device 10, or the user inputs somatosensory information using the somatosensory recognition capability of the camera device 10.

Figure 16:
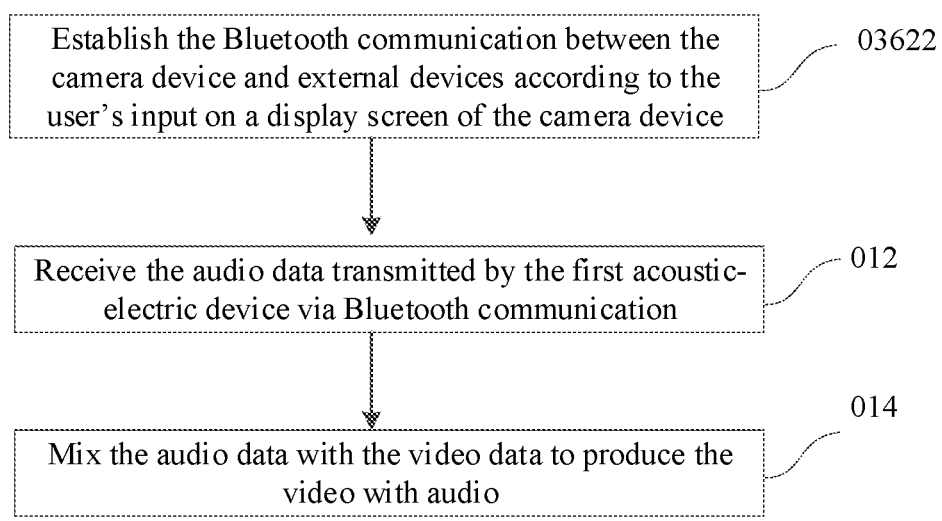

In some embodiments, as shown in FIG. 16, the process 0362 includes the following process.

03622: establishing the Bluetooth communication between the camera device 10 and the external device according to the user's input on the display screen 14 of the camera devices 10.

In some embodiments, as illustrated in FIG. 14, the processor 12 further establishes the Bluetooth communication between the camera device 10 and the external device according to the user's input on the display screen 14 of the camera devices 10. That is, the process 03622 is implemented by the processor 12.

Specifically, the display screen 14 may be a touch-control display screen. When the user inputs on the camera 10, the user may input through the display screen 14 of the camera device 10. For example, in one embodiment, the camera device 10 may display a virtual button of "voice command," and the user may touch the virtual button to enable the camera device 10 to establish the Bluetooth communication with the first acoustic-electric device 20. In another embodiment, the camera device 10 may display a virtual button of "play," and the user may touch the virtual button to make the camera device 10 and the electro-acoustic device 50 establish Bluetooth communication. In one embodiment, multiple icons for Bluetooth connection may be displayed on the camera device 10, and the user may click on an icon corresponding to the external device to realize the Bluetooth connection between the camera device 10 and the external device.

In some embodiments, the camera device 10 may be a device including the handheld member 15 and/or the stabilization device 16. In some other embodiments, the camera device 10 may be a simple handheld device including a camera.

Figure 17:
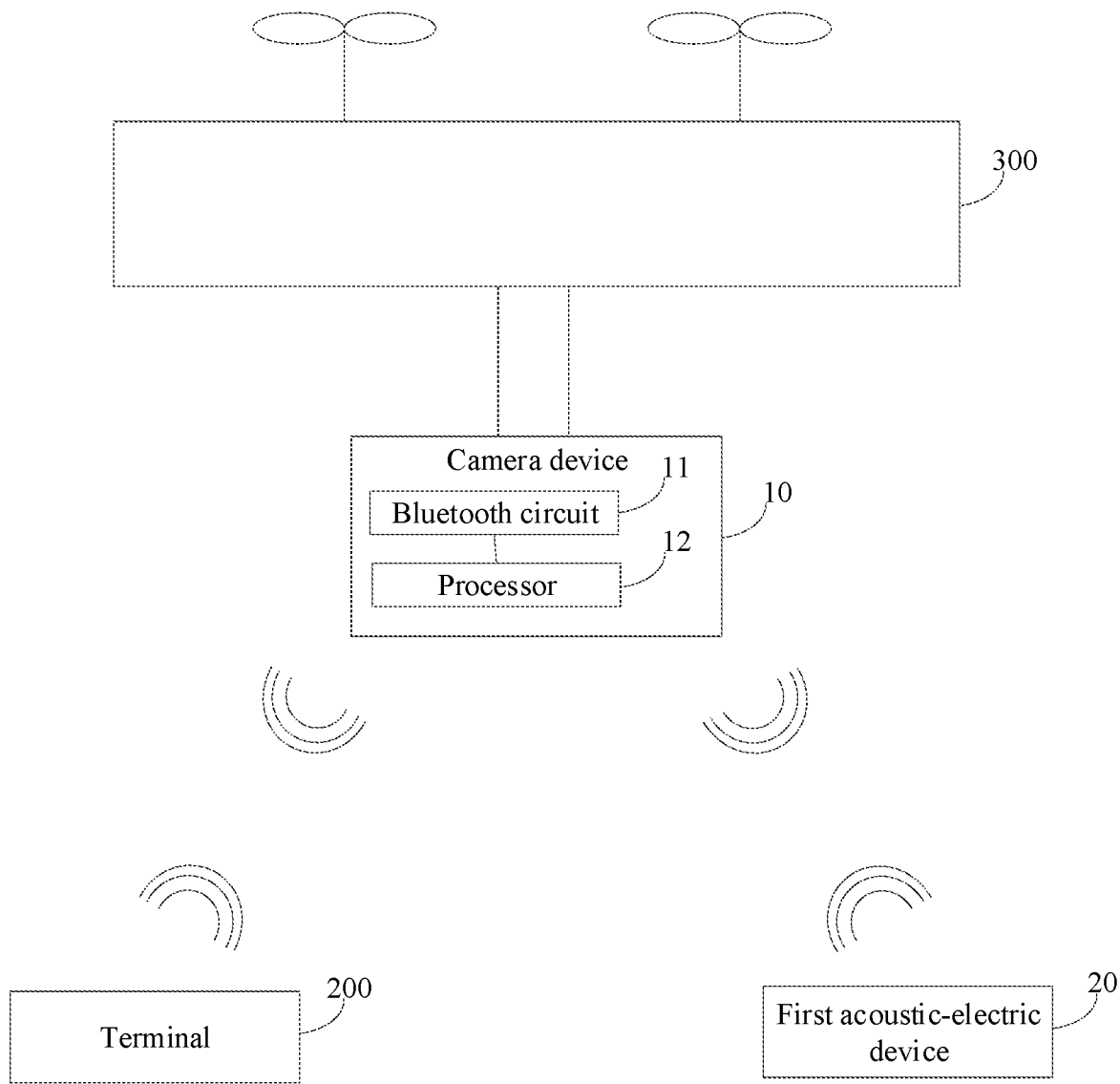
FIG. 17 illustrate an exemplary mobile platform consistent with various embodiments of the present disclosure.

As illustrated in FIG. 17, in some embodiments, the camera device 10 is carried on a mobile platform 300, and the external device is disposed away from the mobile platform 300.

Specifically, the mobile platform 300 may refer to a platform that can move, and may include, for example, an aircraft, a car, a robot, or a mobile vehicle on the water surface. The mobile platform 300 may also be a gimbal. When the camera device 10 is carried on the mobile platform 300, the camera device 10 may be a device with a photographing function, or a device with both a photographing function and a display function.

In one embodiment, the mobile platform 300 may be an aircraft, and the external device may be the first acoustic-electric device 20. The camera device 10 may be installed on the aircraft and capture aerial photography to collect the user's video data. Since the camera device 10 is far away from the user at this time, it may be difficult for the equipment on the aircraft to capture the user's voice. Therefore, the first acoustic-electric device 20 maybe be installed around the user, and the user's audio data may be captured using the first acoustic-electric device 20. Further, the user's audio data may be mixed with the video data captured during aerial photography to produce the video with audio.

In various embodiments, the video data captured by the camera device 10 may be the video data captured when controlling the mobile platform, or the video data captured when controlling the camera device 10.

Figure 18:
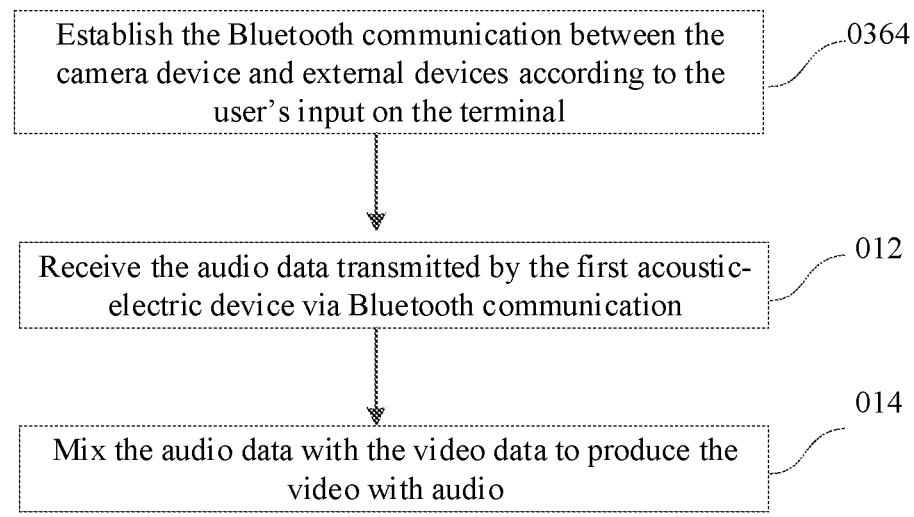
FIG. 18 illustrates another exemplary control method for a camera device consistent with various embodiments of the present disclosure.

In some embodiments, as shown in FIG. 18, the process 036 includes the following process.

0364: establishing the Bluetooth communication between the camera device 10 and the external device, and between the camera device 10 and the terminal 200, according to the user's input on the terminal 200.

In some embodiments, as illustrated in FIG. 17, the processor 12 further establishes the Bluetooth communication between the camera device 10 and the external device, and between the camera device 10 and the terminal 200, according to the user's input on the terminal 200.

Specifically, when the user is inconvenient to directly operate the camera device 10 (for example, when the camera device 10 is carried on the mobile platform 300 which is far away from the user or is in motion), the user may control the camera device 10 to establish Bluetooth communication with the external device through the terminal 200 which is communicatively connected with the camera device 10. The terminal 200 may be a remote control, a mobile phone, or a tablet. The terminal 200 and the camera device 10 may communicate with each other through WIFI, Bluetooth, or a wireless connector. The user's input on the terminal 200 may be button input (physical button or virtual button), voice input, or somatosensory input. The present disclosure has no limit on this.

The terminal 200, the first acoustic-electric device 20, the remote control device 30, the second acoustic-electric device 40, and the electro-acoustic device 50 may be independent devices, or they may be each other to realize the integrated control of the camera device 10. The present disclosure has no limit on this.

In some embodiments, the camera device 10 may be a small-sized handheld gimbal camera. The camera device 10 may be connected to the terminal 200. For example, the camera device 10 may be connected to a side interface of the terminal 200. Correspondingly, the camera device 10 may be carried by the terminal 200 or the terminal 200 may be carried by the camera device 10. Further, because of the small size of the camera device 10, it may be inconvenient to directly operate the camera device 10 and the camera device 10 may be controlled by the terminal 200. For example, the Bluetooth communication between the camera device 10 and the external device can be established through an input by the user on the terminal 200.

In some other embodiments, the camera device 10 may be mounted at another component instead of being handheld. For example, in one embodiment, the camera device 10 may be mounted at a helmet as a head-mounted camera, or clamped on clothes. In one embodiment, the camera device 10 may be a head-mounted camera. When the head-mounted camera is used to capture the video data, since the user is inconvenient to control the head-mounted camera, the first acoustic-electric device 20 and the remote control device 30, the second acoustic-electric device 40, the electro-acoustic device 50, and the terminal 200 may be used to control the head-mounted camera to perform corresponding operations.

The present disclosure also provides a camera system 100. As illustrated in FIG. 2, the camera system 100 includes the first acoustic-electric device 20 and the camera device 10 provided by any embodiment of the present disclosure. In some embodiments, the camera system 100 may further include the remote control device 30, the second acoustic-electric device 40, the electro-acoustic device 50, the terminal 200, and/or the mobile platform 300.

In the present disclosure, the camera system 100 may use the Bluetooth communication method to enable the first acoustic-electric device 20 and the camera device 10 to communicate with each other, such that the first acoustic-electric device 20 and the camera device 10 can be placed in suitable positions according to different occasions. The audio data of the first acoustic-electric device 20 and the video data of the camera device 10 may be mixed to produce the video with audio. The video with audio may have clear sound and moderate volume.

Figure 19:
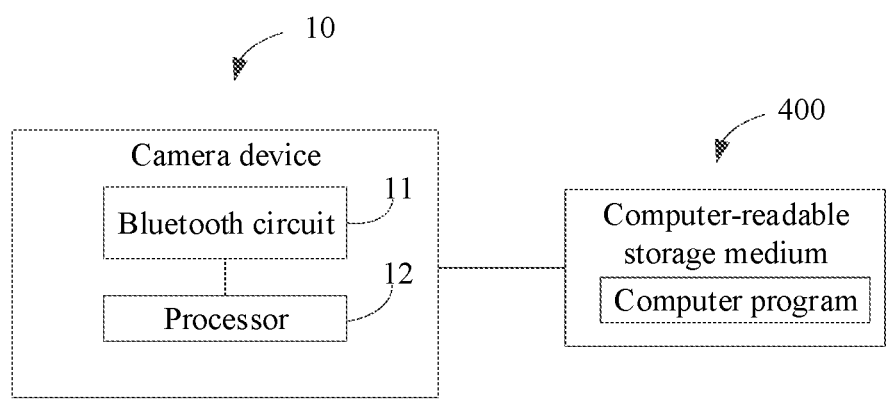
FIG. 19 illustrates an exemplary connection between a camera device and a computer-readable storage medium consistent with various embodiments of the present disclosure.

The present disclosure also provides a computer-readable storage medium. As illustrated in FIG. 19, the computer-readable storage medium includes a computer program that can be used in combination with the camera device 10. The computer program may be configured to be executed by the processor 12 to implement the control method of the camera device 10 provided by various embodiments of the present disclosure.

For example, in one embodiment, the computer program may be configured to be executed by the processor 12 to implement a control method of the camera device 10. The control method includes the following processes.

012: controlling the Bluetooth circuit 11 to receive the audio data transmitted from the first acoustic-electric device 20 via Bluetooth communication, where the audio data is recorded by the first acoustic-electric device 20 when the camera device 10 captures the video data.

014: mixing the audio data and the video data to produce the video with audio.

In another embodiment, the computer program may be configured to be executed by the processor 12 to implement a control method of the camera device 10. The control method includes the following process.

0122: controlling the Bluetooth circuit 11 to receive the audio data transmitted from the first acoustic-electric device 20 through the Bluetooth communication, when the camera device 10 is capturing the video data.

In this disclosure, descriptions with reference to the terms "one embodiment," "some embodiments," "exemplary embodiments," "examples," "specific examples," or "some examples" etc., mean that the specific features, structures, materials, or characteristics described in the embodiments or examples are included in at least one embodiment or example of the present disclosure. In this disclosure, the schematic representations of the above terms do not necessarily refer to the same embodiment or example. Moreover, the described specific features, structures, materials, or characteristics can be combined in any one or more embodiments or examples in an appropriate manner.

Any process or method described in the flowchart or described in other ways herein can be understood as a module, segment, or part of code that includes one or more executable instructions for performing specific logical functions or steps of the process, and the scope of the embodiments of the present disclosure can include additional executions, which may not be in the order shown or described, and includes the execution of functions in a substantially simultaneous manner or in the reverse order according to the functions involved.

Those of ordinary skill in the art will appreciate that the example elements and algorithm steps described above can be implemented in electronic hardware, or in a combination of computer software and electronic hardware. Whether these functions are implemented in hardware or software depends on the specific application and design constraints of the technical solution. For example, the hardware for implementing the functions can include, e.g., one or more of a discrete logic circuit including a logic gate circuit for performing logic functions on data signals, an application-specific integrated circuit with suitable combinational logic gates, a programmable gate array (PGA), a field programmable gate array (FPGA), etc. One of ordinary skill in the art can use different methods to implement the described functions for different application scenarios, but such implementations should not be considered as beyond the scope of the present disclosure.

For simplification purposes, detailed descriptions of the operations of example systems, devices, and units may be omitted and references can be made to the descriptions of the example methods.

The disclosed systems, apparatuses, and methods may be implemented in other manners not described here. For example, the devices described above are merely illustrative. For example, the division of units may only be a logical function division, and there may be other ways of dividing the units. For example, multiple units or components may be synthesized or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit.

A method consistent with the disclosure can be implemented in the form of computer program stored in a non-transitory computer-readable storage medium, which can be sold or used as a standalone product. The computer program can include instructions that enable a computer device, such as a personal computer, a server, or a network device, to perform part or all of a method consistent with the disclosure, such as one of the example methods described above. The storage medium can be any medium that can store program codes, for example, a USB disk, a mobile hard disk, a read-only memory (ROM), a random access memory (RAM), a magnetic disk, or an optical disk.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the following claims.

What is claimed is:

1. A control method of a camera device comprising:
   in response to detecting establishment of Bluetooth communication between the camera device and an acoustic-electric device, sending an audio recording instruction to the acoustic-electric device to trigger the acoustic-electric device to record audio data according to the audio recording instruction;
   receiving the audio data transmitted by the acoustic-electric device via the Bluetooth communication, the audio data being recorded by the acoustic-electric device during a process of capturing video data by the camera device; and
   mixing the audio data with the video data to produce a video with audio.

2. The method according to claim 1, wherein receiving the audio data transmitted by the acoustic-electric device via the Bluetooth communication includes:
   synchronously receiving the audio data transmitted by the acoustic-electric device via the Bluetooth communication during the process of capturing the video data by the camera device.

3. The method according to claim 1, further comprising, before receiving the audio data transmitted by the acoustic-electric device via the Bluetooth communication:
   controlling the camera device to capture the video data in response to detecting a photographing trigger event.

4. The method according to claim 3, further comprising:
   receiving a control instruction transmitted by a remote control device via the Bluetooth communication; and
   controlling the camera device to perform a corresponding operation according to the control instruction.

5. The method according to claim 4, wherein:
   the control instruction includes a video recording instruction; and
   the photographing trigger event includes receiving the control instruction.

6. The moving according to claim 5, wherein the control instruction includes a button control instruction.

7. The method according to claim 4,
   wherein the acoustic-electric device is a first acoustic-electric device;
   the method further comprising:
      receiving a voice control instruction transmitted by a second acoustic-electric device via the Bluetooth communication; and
      controlling the camera device to perform a corresponding operation according to the voice control instruction.

8. The method according to claim 7, wherein:
   the voice control instruction includes a video recording instruction; and
   the photographing trigger event includes receiving the video recording instruction.

9. The method according to claim 7, wherein the first acoustic-electric device or the second acoustic-electric device includes a Bluetooth microphone.

10. The method according to claim 1, further comprising, after mixing the audio data with the video data to produce the video with audio:
    receiving a play instruction for the video with audio; and
    in response to detecting establishment of the Bluetooth communication between the camera device and an electro-acoustic device, transmitting the audio data in the video with audio to the electro-acoustic device according to the play instruction to enable the electro-acoustic device to play the audio data.

11. The method according to claim 10, wherein the electro-acoustic device includes a Bluetooth headset.

12. The method according to claim 1, further comprising:
    establishing the Bluetooth communication between the camera device and an external device according to a user input, the external device including the acoustic-electric device.

13. The method according to claim 12, wherein establishing the Bluetooth communication between the camera device and the external device according to the user input includes:
    establishing the Bluetooth communication between the camera device and the external device according to the user input on the camera device.

14. The method according to claim 13, wherein establishing the Bluetooth communication between the camera device and the external device according to the user input on the camera device includes:
    establishing the Bluetooth communication between the camera device and the external device according to the user input on a display screen of the camera device.

15. The method according to claim 14, wherein:
    the camera device further includes a photographing member and a handheld member configured to support the photographing member; and the display screen is disposed at the handheld member.

16. The method according to claim 12, wherein establishing the Bluetooth communication between the camera device and the external device according to the user input includes:
   establishing the Bluetooth communication between the camera device and the external device according to the user input on a terminal communicatively connected to the camera device.

17. The method according to claim 12, wherein:
   the camera device is carried by a mobile platform; and
   the external device is disposed away from the mobile platform.

18. A camera device, comprising:
   a Bluetooth circuit configured to:
      in response to detecting establishment of Bluetooth communication between the camera device and an acoustic-electric device, send an audio recording instruction to the acoustic-electric device to trigger the acoustic-electric device to record audio data according to the audio recording instruction; and
      receive the audio data transmitted by the acoustic-electric device via the Bluetooth communication, the audio data being recorded by the acoustic-electric device during a process of capturing video data by the camera device; and
   a processor configured to mix the audio data and the video data to produce a video with audio.

19. A camera system comprising:
   an acoustic-electric device; and
   a camera device including:
      a Bluetooth circuit configured to:
         in response to detecting establishment of Bluetooth communication between the camera device and the acoustic-electric device, send an audio recording instruction to the acoustic-electric device to trigger the acoustic-electric device to record audio data according to the audio recording instruction; and
         receive the audio data transmitted by the acoustic-electric device via the Bluetooth communication, the audio data being recorded by the acoustic-electric device during a process of capturing video data by the camera device; and
      a processor configured to mix the audio data and the video data to produce a video with audio.

* * * * *